US009969263B2

(12) United States Patent
Tsunoda et al.

(10) Patent No.: US 9,969,263 B2
(45) Date of Patent: May 15, 2018

(54) MOBILE TERMINAL DEVICE, ON-VEHICLE DEVICE, AND ON-VEHICLE SYSTEM

(75) Inventors: Seiichi Tsunoda, Nissin (JP); Daiki Isogai, Aichi (JP); Yasutomo Kato, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 7 days.

(21) Appl. No.: 14/424,188

(22) PCT Filed: Sep. 6, 2012

(86) PCT No.: PCT/JP2012/072812
§ 371 (c)(1),
(2), (4) Date: Feb. 26, 2015

(87) PCT Pub. No.: WO2014/038050
PCT Pub. Date: Mar. 13, 2014

(65) Prior Publication Data
US 2015/0224876 A1    Aug. 13, 2015

(51) Int. Cl.
*G09G 5/00*        (2006.01)
*B60K 35/00*      (2006.01)
(Continued)

(52) U.S. Cl.
CPC ............ *B60K 35/00* (2013.01); *G06F 3/0482* (2013.01); *G06F 3/0486* (2013.01);
(Continued)

(58) Field of Classification Search
CPC ............ B60K 35/00; B60K 2350/1008; B60K 2350/106; G06F 3/0482; G06F 3/0386;
G06F 3/04886; G06F 3/1438; G06F 2203/04803; G08B 5/225; H04M 1/7253; H04M 2250/16; G09G 2380/10
(Continued)

(56) References Cited

U.S. PATENT DOCUMENTS

2006/0092466 A1*   5/2006  Ikeda ................... G06F 3/1423
                                                                                358/1.15
2010/0014284 A1   1/2010  Hancock
(Continued)

FOREIGN PATENT DOCUMENTS

DE    102009036371 A1    4/2011
DE    102010033883 A1    2/2012
(Continued)

OTHER PUBLICATIONS

Yasushi Uchida, "Widgets Can Change the Future of Consumer Electronics", Nikkei Electronics, Japan, Nikkei Business Publications, Inc., Jul. 2, 2007, the 955th Issue, pp. 93-101.

*Primary Examiner* — Mark Regn
(74) *Attorney, Agent, or Firm* — Finnegan, Henderson, Farabow, Garrett & Dunner, LLP

(57) ABSTRACT

An on-vehicle system 100 according to an embodiment of the present invention causes a mobile terminal device 40 and an on-vehicle device 50 to work together, and allocates and displays two pieces of application software information about a widget from the mobile terminal device 40 on two display areas of gadget displays 61V and 62V connected to the on-vehicle device 50. Also, the allocation of the application software information is conducted via a touch panel 3 on the mobile terminal device 40 provided with a display device 6 for displaying a widget setting screen.

4 Claims, 7 Drawing Sheets

(51) Int. Cl.
*H04M 1/725* (2006.01)
*G06F 3/0482* (2013.01)
*G06F 3/0486* (2013.01)
*G06F 3/0488* (2013.01)
*G06F 3/14* (2006.01)
*G08B 5/22* (2006.01)

(52) U.S. Cl.
CPC ........ *G06F 3/04886* (2013.01); *G06F 3/1438* (2013.01); *G08B 5/225* (2013.01); *H04M 1/7253* (2013.01); *B60K 2350/106* (2013.01); *B60K 2350/1008* (2013.01); *G06F 2203/04803* (2013.01); *G09G 2380/10* (2013.01); *H04M 2250/16* (2013.01)

(58) Field of Classification Search
USPC .......................................................... 345/2
See application file for complete search history.

(56) References Cited

U.S. PATENT DOCUMENTS

| | | |
|---|---|---|
| 2010/0138149 A1 | 6/2010 | Ohta et al. |
| 2010/0220250 A1 | 9/2010 | Vanderwall et al. |
| 2012/0159380 A1* | 6/2012 | Kocienda ............ G06F 3/04883 715/783 |
| 2014/0078022 A1* | 3/2014 | Dusterhoff ............ G06F 3/1423 345/3.1 |

FOREIGN PATENT DOCUMENTS

| | | |
|---|---|---|
| JP | 2006-133872 | 5/2006 |
| JP | 2010-514604 A | 5/2010 |
| JP | 2010-130669 | 6/2010 |
| JP | 2012-063249 A | 3/2012 |
| JP | 2012-117967 | 6/2012 |
| JP | 2012-124578 A | 6/2012 |

* cited by examiner

FIG.4
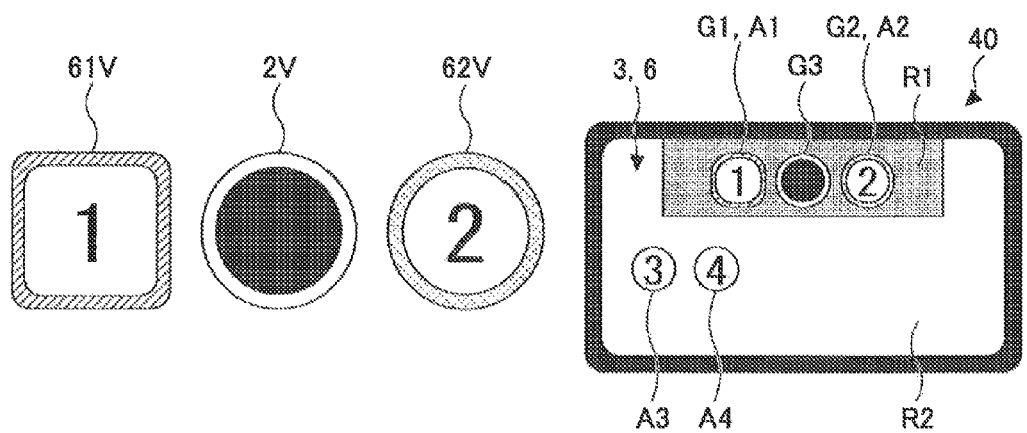
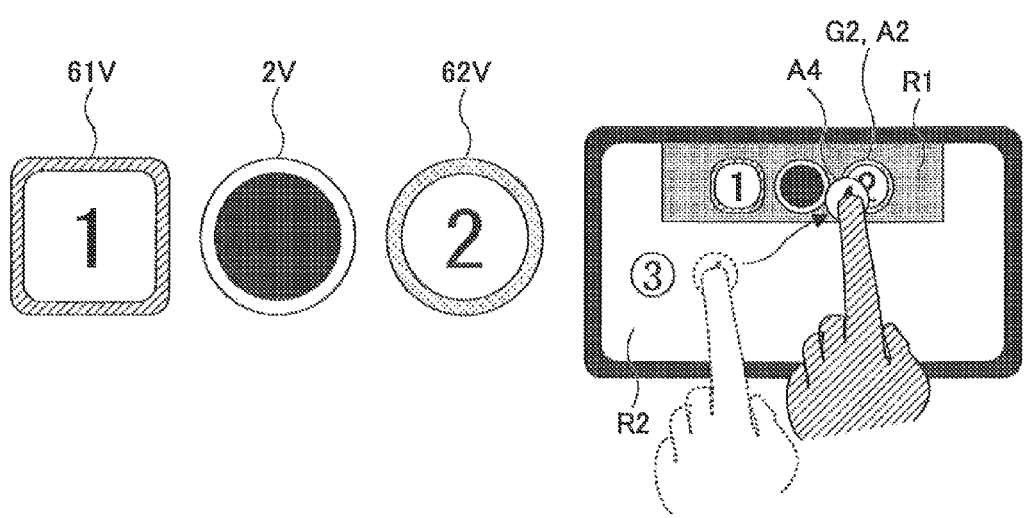
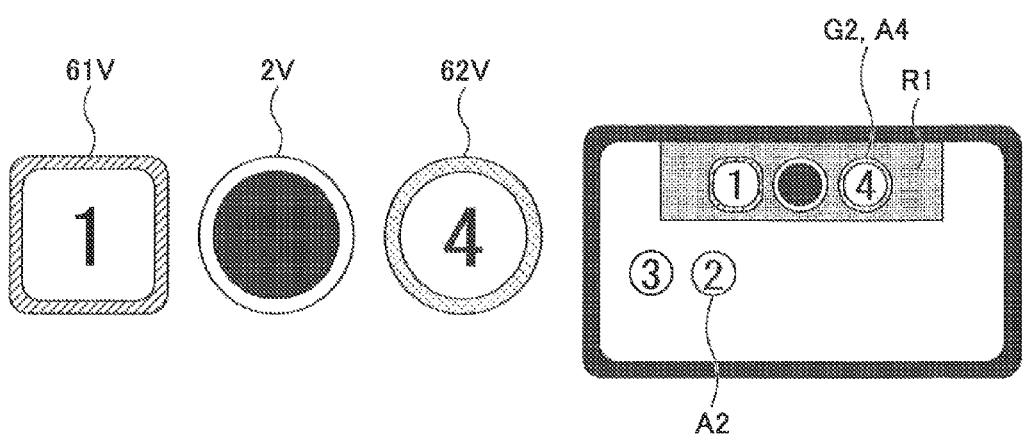

FIG.5
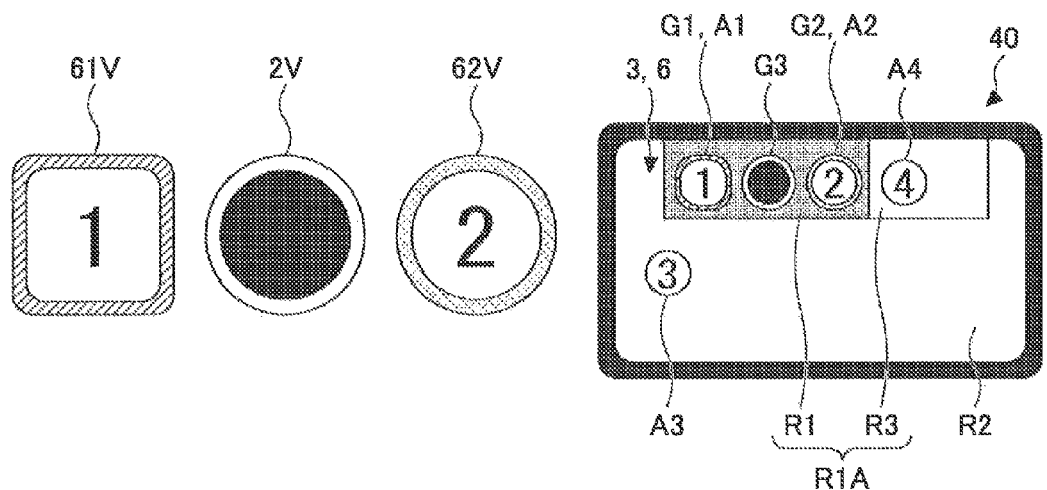
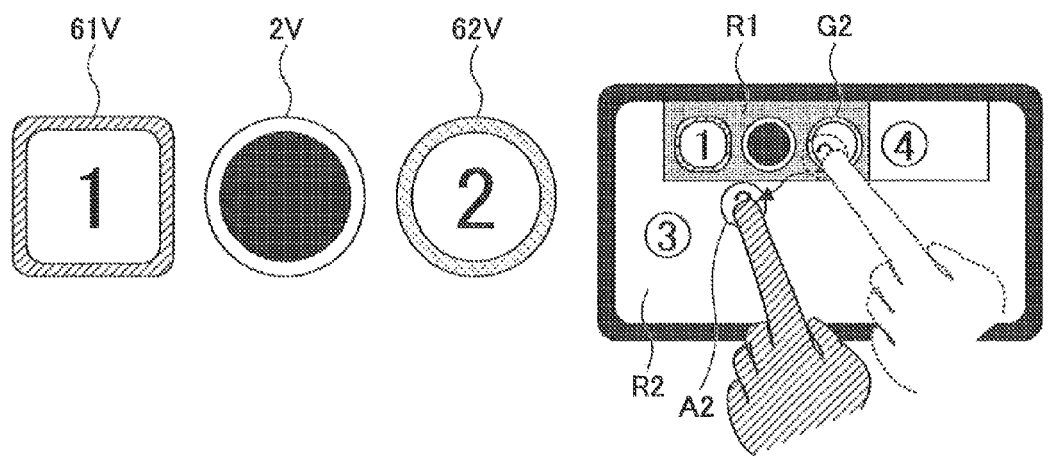
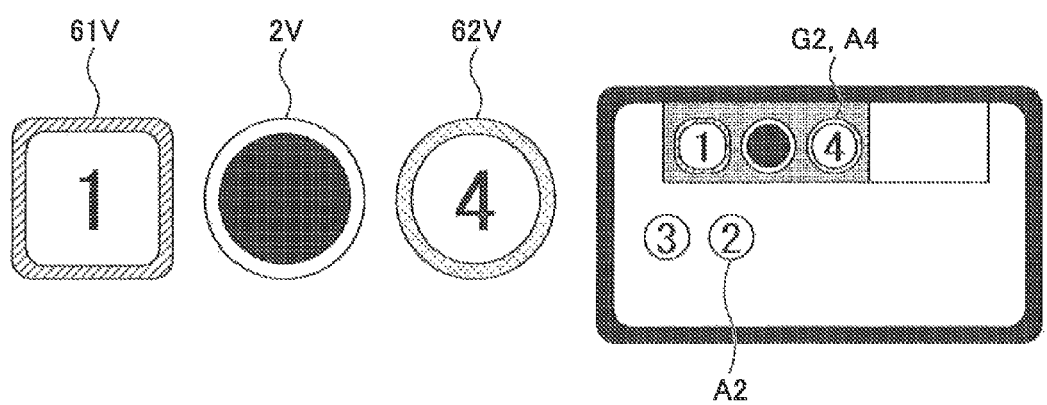

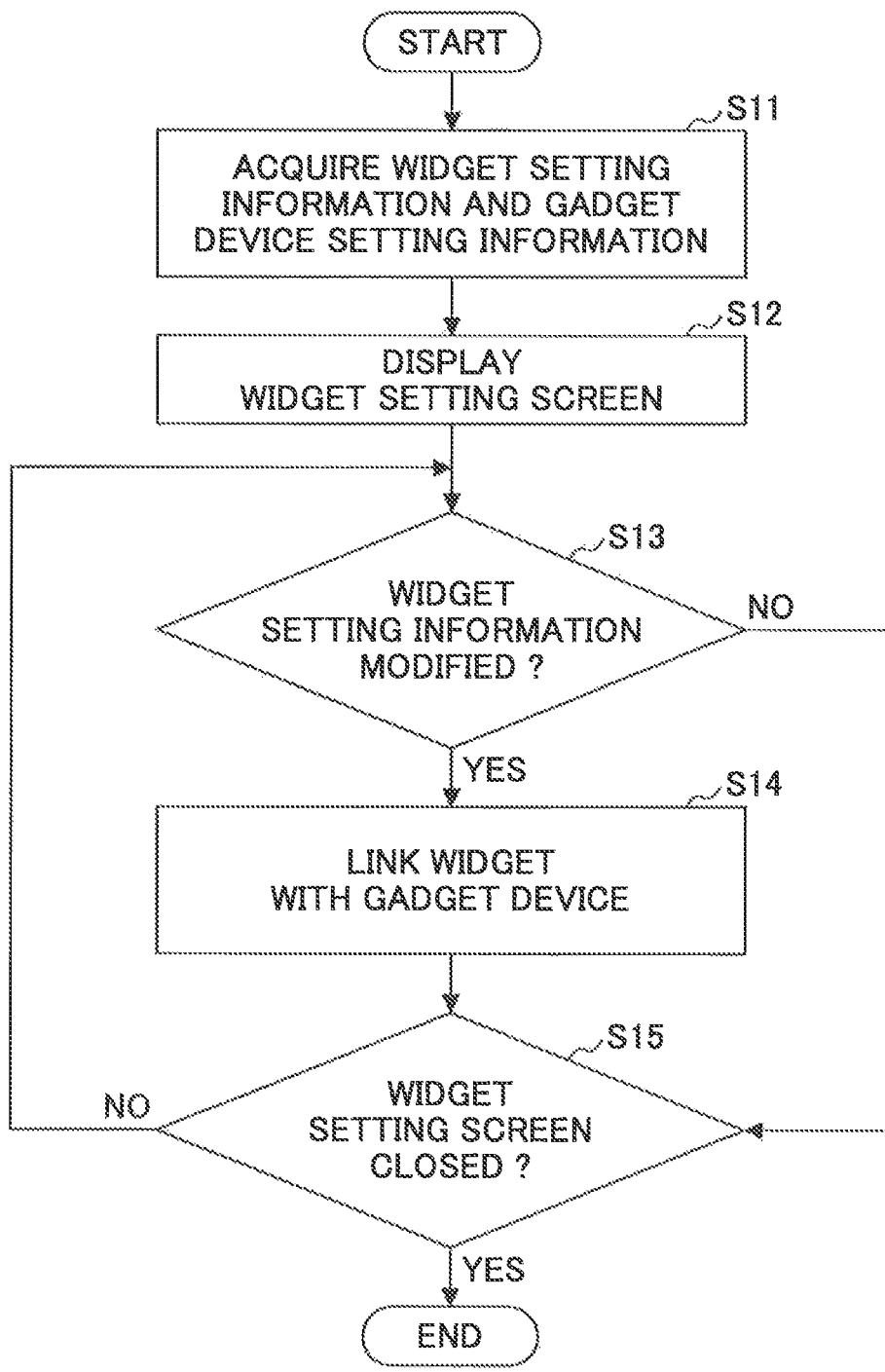

MOBILE TERMINAL DEVICE, ON-VEHICLE DEVICE, AND ON-VEHICLE SYSTEM

CROSS-REFERENCE TO RELATED APPLICATIONS

This application is a national phase application of International Application No. PCT/JP2012/072812, filed Sep. 6, 2012, the content of which is incorporated herein by reference.

TECHNICAL FIELD

The present invention relates to a mobile terminal device, an on-vehicle device working together with the mobile terminal device, and an on-vehicle system causing the mobile terminal device and the on-vehicle device to work together.

BACKGROUND ART

Conventionally, a wireless communication system has been known which includes a mobile terminal device providing data and an on-vehicle device wirelessly communicating with the mobile terminal device (for example, Patent Document 1).

The on-vehicle device in this wireless communication system establishes a wireless communication with the mobile terminal device and displays image data obtained from the mobile terminal device on an on-vehicle display when the mobile terminal device comes within a wirelessly communicable distance.

RELATED-ART DOCUMENTS

Patent Documents

[Patent Document 1]
  Japanese Laid-open Patent Publication No. 2010-130669

SUMMARY OF THE INVENTION

Problem to be Solved by Invention

However, the Patent Document 1 only discloses that an image provided by a single application software (hereinafter referred to as "APP") executed in the mobile terminal device is displayed on the on-vehicle display. The Patent Document 1 does not refer to a processing in a case where a plurality of APPs are simultaneously executed in the mobile terminal device.

In view of the above, it is an object of the present invention to provide an on-vehicle system causing a mobile terminal device and an on-vehicle device to work together so that a piece of information about the APPs is visible on an on-vehicle display device when the APPs are simultaneously executed in the mobile terminal device, and the on-vehicle device and the mobile terminal device which constitute the on-vehicle system.

Means to Solve the Problem

In order to achieve the above object, an on-vehicle system according to an embodiment of the present invention causes an on-vehicle device and a mobile terminal device to work together. The on-vehicle system allocates and displays a plurality of pieces of application software information from the mobile terminal device on a plurality of display areas on one or more display devices connected to the on-vehicle device.

Also, a mobile terminal device according to an embodiment of the present invention constitutes an on-vehicle system which causes an on-vehicle device and the mobile terminal device to work together. The mobile terminal device outputs a plurality of pieces of application software information allocated and displayed on a plurality of display areas on one or more display devices connected to the on-vehicle device.

Also, an on-vehicle device according to an embodiment of the present invention constitutes an on-vehicle system which causes the on-vehicle device and a mobile terminal device to work together. The on-vehicle device is connected to one or more display devices which provide a plurality of display areas on which a plurality of pieces of application software information from the mobile terminal device are allocated and displayed.

Advantage of the Invention

According to the above means, the present invention can provide an on-vehicle system causing a mobile terminal device and an on-vehicle device to work together so that a piece of information about APPs is visible on an on-vehicle display device when the APPs are simultaneously executed in the mobile terminal device, and the on-vehicle device and the mobile terminal device which constitute the on-vehicle system.

BRIEF DESCRIPTION OF DRAWINGS

FIG. 4 is a diagram illustrating temporal transitions of states of a gadget device and states of a widget setting screen;

FIG. 5 is a diagram illustrating temporal transitions of states of a gadget device and states of a widget setting screen;

FIG. 7 is a flowchart illustrating a flow of a setting information modification processing.

MODE FOR CARRYING OUT THE INVENTION

In the following, modes for carrying out the present invention will be described with reference to the drawings.

Figure 1:
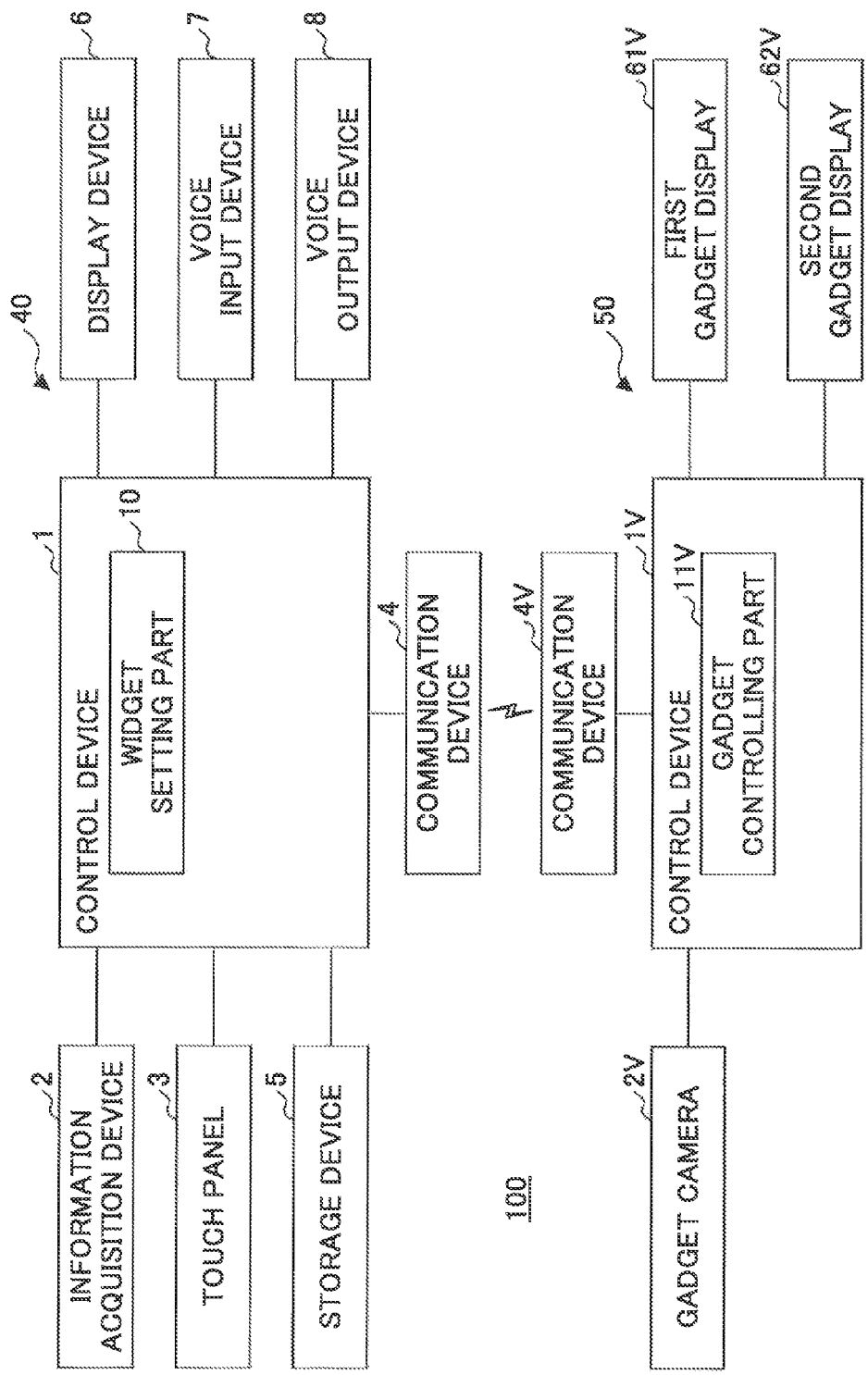
FIG. 1 is a functional block diagram illustrating a configuration example of an on-vehicle system according to an embodiment of the present invention.
Figure 2:
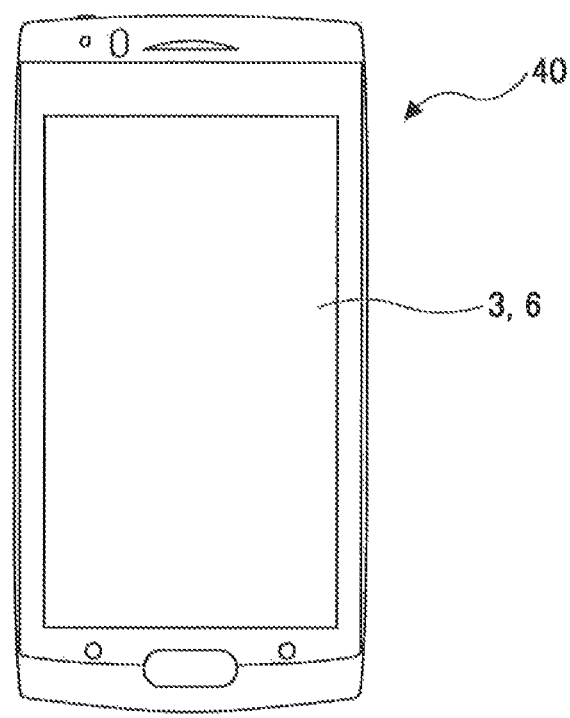
FIG. 2 is a front view of a mobile terminal device in FIG. 1.

FIG. 1 is a functional block diagram illustrating a configuration example of an on-vehicle system 100 according to an embodiment of the present invention. The on-vehicle system 100 causes a mobile terminal device 40 and an on-vehicle device 50 to work together. The on-vehicle system 100 includes the mobile terminal device 40 and the on-vehicle device 50 as a component thereof. Also, FIG. 2 is a front view of the mobile terminal device 40. In the present embodiment, the on-vehicle system 100 displays a piece of information about a widget running on the mobile terminal device 40 on a plurality of display areas on one or more displays connected to the on-vehicle device 50.

A "widget" is a small-scale accessory APP running on the mobile terminal device 40. For example, the widget is an APP which acquires a new piece of information at regular intervals and displays it. Specifically, the widget includes an APP which displays stock price information, weather forecast, altitude, coastal wave forecast, or the like. Also, the widget includes an APP which displays calendar, clock time, etc., a slide show APP which sequentially displays images of a surrounding area of a vehicle obtained from a website, an APP which displays a degree of eco-driving based on pieces of vehicle operating information, or the like. The widget may be downloaded via a communication network or may be provided as being stored in a storage medium.

The mobile terminal device 40 is a terminal device carried by an occupant. For example, the mobile terminal device 40 includes a mobile phone, a smartphone, a Personal Digital Assistant (PDA), a portable game device, a tablet computer, or the like. In the present embodiment, the mobile terminal device 40 is a smartphone. The mobile terminal device 40 mainly includes a control device 1, an information acquisition device 2, a touch panel 3, a communication device 4, a storage device 5, a display device 6, a voice input device 7, and a voice output device 8.

The control device 1 controls the mobile terminal device 40. In the present embodiment, the control device 1 is a computer provided with a Central Processing Unit (CPU), a Random Access Memory (RAM), a Read-Only Memory (ROM), and the like. For, example, the control device 1 reads out a program corresponding to an after-mentioned widget setting part 10, loads it into the RAM, and causes the CPU to perform a procedure corresponding to the widget setting part 10. The program corresponding to the widget setting part 10 may be downloaded via a communication network or may be provided as being stored in a storage medium.

The information acquisition device 2 acquires a piece of information from outside. In the present embodiment, the information acquisition device is a wireless communication device for a mobile phone communication network, a public wireless LAN, or the like.

The touch panel 3 is one of operation input devices mounted on the mobile terminal device 40. For example, the touch panel 3 is a multi-touch type touch panel located on the display device 6 and supports a multi-touch gesture function.

The communication device 4 controls a communication with the on-vehicle device 50. In the present embodiment, the communication device 4 is connected to a communication device 4V in the on-vehicle device 50 via Near Field Communication (hereinafter referred to as "NFC"). A wireless communication based on the Bluetooth (registered trademark), the Wi-Fi (registered trademark), or the like may be used for the communication between the communication device 4 and the communication device 4V. A wire communication based on the Universal Serial Bus (USB) or the like may be used for the communication.

In the present embodiment, the communication device 4 transmits a reply request signal periodically. The communication device 4V sends back a reply signal to the communication device 4 upon receiving the reply request signal. Then, the communication device 4 establishes a wireless communication with the communication device 4V upon receiving the reply signal. Alternatively, the communication device 4V may transmit a reply request signal periodically or each of the communication device 4 and the communication device 4V may transmit a reply request signal periodically. In this case, the communication device 4 sends back a reply signal to the communication device 4V upon receiving the reply request signal. Then, the communication device 4V establishes a wireless communication with the communication device 4 upon receiving the reply signal. Then, the communication device 4 outputs to the control device 1 a control signal informing that a wireless communication with the communication device 4V has been established when the wireless communication with the communication device 4V has been established.

The storage device 5 stores various pieces of information. For example, the storage device 5 includes a non-volatile semiconductor memory such as a flash memory. In the present embodiment, the storage device 5 stores an APP, a widget, or the like which is executed on the mobile terminal device 40.

The display device 6 displays various pieces of information. For example, the display device 6 is a liquid crystal display. The voice input device 7 is a device for inputting a voice. For example, the voice input device 7 is a microphone. The voice output device 8 outputs various pieces of audio information. For example, the audio output device 8 is a speaker.

Next, the on-vehicle device 50 will be described. The on-vehicle device 50 is mounted on a vehicle. The on-vehicle device 50 mainly includes a control device 1V, a gadget camera 2V, a first gadget display 61V, and a second gadget display 62V.

The control device 1V controls the on-vehicle device 50. In the present embodiment, the on-vehicle device 50 is a computer provided with a CPU, a RAM, a ROM, and the like. For example, the control device 1V reads out a program corresponding to an after-mentioned gadget controlling part 11V, loads it into the RAM, and causes the CPU to perform a procedure corresponding to the gadget controlling part 11V. The program corresponding to the gadget controlling part 11V may be downloaded via a communication network or may be provided as being stored in a storage medium.

The gadget camera 2V, the first gadget display 61V, and the second gadget display 62V are gadget devices connected to the on-vehicle device 50. A "gadget device" is a device selectively connected to the on-vehicle device 50 depending on a user's preference. Specifically, the gadget camera 2V is a camera taking an image of a vehicle interior. The first gadget display 61V and the second gadget display 62V are small liquid crystal displays. Other gadget devices such as an illuminating device, a speaker, and the like may be connected to the on-vehicle device 50.

Also, in the present embodiment, the gadget camera 2V, the first gadget display 61V, and the second gadget display 62V are detachably connected to the on-vehicle device 50 via a Universal Serial Bus (USB) receptacle located at an instrument panel. The gadget camera 2V, the first gadget display 61V, and the second gadget display 62V may be connected to the on-vehicle device 50 via an interface other than the USB such as a digital Visual Interface (DVI) or the like, or may be non-detachably connected to the on-vehicle device 50 via a dedicated interface.

Here, functional elements running on each of the control device 1 in the mobile terminal device 40 and the control device 1V in the on-vehicle device 50 will be described.

The widget setting part 10 of the control device 10 in the mobile terminal device 40 is a functional element which sets a widget executed in the mobile terminal device 40. In the present embodiment, the widget setting part 10 configures a setting of a widget executed in the mobile terminal device 40 when a wireless communication has been established between the mobile terminal device 40 and the on-vehicle device 50.

For example, the widget setting part 10 automatically displays a widget setting screen on the display device 6 on the mobile terminal device 40 when the wireless communication has been established between the mobile terminal device 40 and the on-vehicle device 50.

A user can select a widget executed when the wireless communication has been established through an operation input to the touch panel 3 while viewing the widget setting screen. A method of selecting a widget executed when the wireless communication has been established through using the widget setting screen will be described in detail later.

Also, the widget setting part 10 obtains a piece of widget setting information stored in the RAM or the like, for example, when the wireless communication has been established between the mobile terminal device 40 and the on-vehicle device 50. The widget setting information is a piece of information about a widget configured through the widget setting screen. For example, the widget setting information includes an order of priority for widgets which start when the wireless communication has been established, or the like.

Also, the widget setting part 10 may receive a piece of gadget device setting information from the on-vehicle device 50 and may link a widget which starts when the wireless communication has been established with a gadget device connected to the on-vehicle device 50.

The gadget controlling part 11V of the control device 1V in the on-vehicle device 50 is a functional element which controls a gadget device connected to the on-vehicle device 50. In the present embodiment, the gadget controlling part 11V obtains the gadget device setting information stored in the RAM or the like, for example, when the wireless communication has been established between the mobile terminal device 40 and the on-vehicle device 50. The gadget device setting information is a piece of information about a gadget device connected to the on-vehicle device 50. For example, the gadget device setting information includes presence or absence of a gadget device connected to each USB receptacle, a type of a connected gadget device, and the like. The on-vehicle device 50 may update the gadget device setting information on each boot up, or may update it each time the gadget device is attached or detached.

Then, the gadget controlling part 11V receives the widget setting information from the mobile terminal device 40, and links the widget with the gadget device based on the widget setting information and the gadget device setting information. In the present embodiment, the gadget device controlling part 11V links the highest priority widget executed in the mobile terminal device 40 (hereinafter referred to as "first priority widget") with the first gadget display 61V. Also, the gadget controlling part 11V links the second highest priority widget executed in the mobile terminal device 40 (hereinafter referred to as "second priority widget") with the second gadget display 62V. However, if a correspondence relationship between a widget and a gadget device has already been configured in the widget setting information, the gadget controlling part 11V links the widget with the gadget device according to the correspondence relationship.

The gadget controlling part 11V may conduct authentication of the mobile terminal device 40 which sends out the widget setting information. For example, the gadget controlling part 11V may conduct authentication of the mobile terminal device 40 by checking that the mobile terminal device 40 which sends out the widget setting information has been pre-registered in the on-vehicle device 50. In this case, the gadget controlling part 11V may reject a linkage based on the widget setting information from an unauthenticated mobile terminal device 40.

Then, the gadget controlling part 11V periodically updates a view of the first gadget display 61V by allocating and transferring a piece of application software information (hereinafter referred to as "APP information") periodically received from the first priority widget to the first gadget display 61V. Similarly, the gadget controlling part 11V periodically updates a view of the second gadget display 62V by allocating and transferring a piece of APP information periodically received from the second priority widget to the second gadget display 62V.

A piece of "APP information" is a piece of information transmitted from a widget. For example, the APP information includes a piece of information necessary for updating an image on a display. The piece of information necessary for updating an image on a display may be a piece of information necessary for updating the entire image, or may be a piece of information necessary for updating a part of the image.

Here, in reference to FIG. 3, it will be described how a plurality of gadget displays show the APP information about a corresponding widget.

Figure 3:
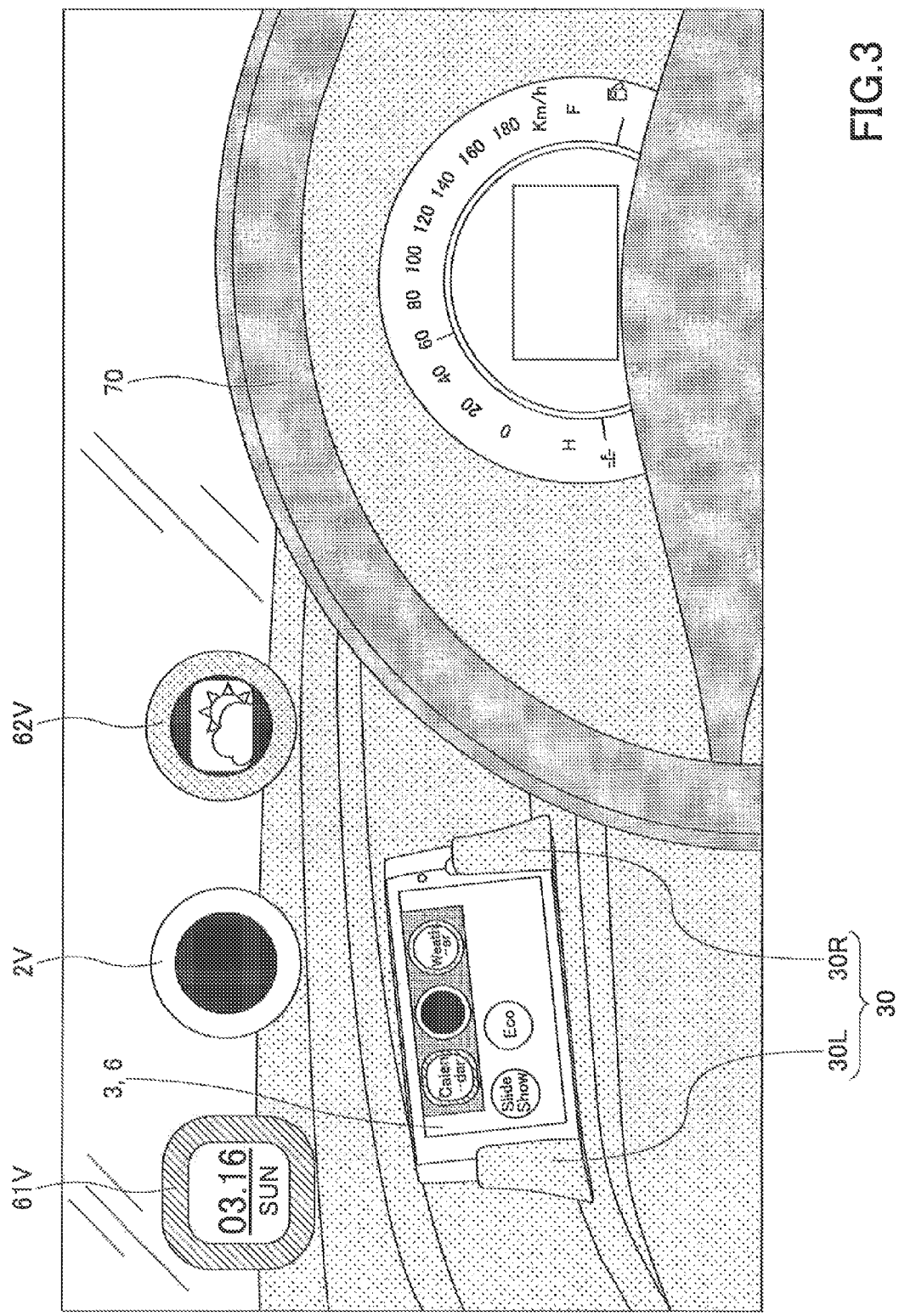
FIG. 3 is a diagram illustrating a state where a mobile terminal device is docked in a dock.

FIG. 3 illustrates a state where the mobile terminal device 40 is docked in a dock 30. Specifically, FIG. 3 illustrates a state where the mobile terminal device 40 is held in a predetermined position by a left guide portion 30L and a right guide portion 30R which constitute the dock 30. The left guide portion 30L and the right guide portion 30R are made from resin material, for example. Preferably, the left guide portion 30L and the right guide portion 30R are made from the same material as that of a dashboard. The left guide portion 30L and the right guide portion 30R may be formed integrally with the dashboard. The mobile terminal device 40 is loaded into the dock 30 by sliding each of its upper part and its lower part from up above the dock 30 along internal guide grooves (not shown) at each of the left guide portion 30L and the right guide portion 30R. Also, the mobile terminal device 40 is held by the dock 30 with the touch panel 3 and the display device 6 directed to a driver. By this configuration, the driver can, for example, conduct an operation input to the touch panel 3 by stretching his/her hand placed on a steering wheel.

The widget setting part 10 outputs the widget setting information to the gadget controlling part 11V in the on-vehicle device 50 when the mobile terminal device 40 is loaded into the dock 30 and when a wireless communication is established between the mobile terminal device 40 and the on-vehicle device 50.

The gadget controlling part 11V links a widget with a gadget device based on a received widget setting information. In the present embodiment, the gadget controlling part 11V links a time display APP as the first priority widget with the first gadget display 61V, and links a weather forecast APP as the second priority widget with the second gadget display 62V.

Also, FIG. 3 illustrates a state where a widget setting screen is displayed on the display device 6 on the mobile terminal device 40, a piece of APP information about the time display APP is displayed on the first gadget display 61V, and a piece of APP information about the weather forecast APP is displayed on the second gadget display 62V.

Next, in reference to FIG. 4, a method of selecting a widget executed when the wireless communication has been established via the widget setting screen will be described.

FIG. 4 illustrates temporal transitions of states of a gadget device and states of a widget setting screen in three steps: an upper step, a center step, and a lower step. Specifically, FIG. 4 illustrates states of the gadget device at left sides of respective steps and illustrates states of the widget setting screen at right sides of respective steps.

As shown in the right side of the upper step in FIG. 4, the widget setting screen has a region R1 and a region R2 outside of the region R1. The region R1 includes widget icons A1, A2 which represent widgets executed when the wireless communication has been established. The region R2 includes widget icons A3, A4 which represent widgets which can be set to be executed when the wireless communication has been established although they are not set to be as such at the current moment. Also, the region R1 includes gadget device icons G1-G3 which represent gadget devices connected to the on-vehicle device 50. Also, the widget icons A1, A2, A3, and A4 are linked with a first widget, a second widget, a third widget, and a fourth widget, respectively. Also, the gadget device icons G1, G2, and G3 are linked with the first gadget display 61V, the second gadget display 62V, and the gadget camera 2V, respectively. Also, in the present embodiment, shapes and positions of the gadget device icons G1, G2, and G3 are defined based on shapes and positions of the gadget devices actually being connected to the on-vehicle device 50.

Also, the right side of the upper step in FIG. 4 shows a state of the widget setting screen where the first widget is linked with the first gadget display 61V and the second widget is linked with the second gadget display 62V. Also, the left side of the upper step in FIG. 4 shows that the APP information about the first widget is displayed on the first gadget display 61V and the APP information about the second widget is displayed on the second gadget display 62V.

Also, the right side of the center step in FIG. 4 shows a state where the widget icon A4 in the region R2 linked with the fourth widget is dragged to the region R1 and dropped at the position of the gadget device icon G2 in the region R1, and the lower step in FIG. 4 shows a state after that. Also, the left side of the center step in FIG. 4 shows that there is no change in states of the first gadget display 61V and the second gadget display 62V in the course of the above drag and drop operations.

In the right side of the lower step in FIG. 4, the widget setting screen shows a state where the fourth widget in place of the second widget is linked with the second gadget display 62V. Also, the left side of the lower step in FIG. 4 shows a state where the APP information about the fourth widget has been newly displayed on the second gadget display 62V which had been displaying the APP information about the second widget.

In this way, the user can change a widget linked with each of the first gadget display 61V and the second gadget display 62V through the widget setting screen, and can reflect the change in real time.

Also, the widget setting screen shows a gadget device icon having a shape corresponding to a shape of an actual gadget device at a position corresponding to a position of the actual gadget device. Thus, the user can link a widget with a gadget device more intuitively in comparison to a case where the user links a widget with a gadget device by using a correspondence table, a list view, or the like.

Also, the user can link widgets with gadget devices all at once via the widget setting screen. Thus, there is no need to adjust a hardware setting for each gadget device.

In the above embodiment, the user replaces a widget icon in the region R1 with a widget icon in the region R2. However, the user may reverse positions of two widget icons in the region R1. For example, the user may reverse the positions of the widget icon A1 linked with the gadget device icon G1 and the widget icon A2 linked with the gadget device icon G2. In this case, the widget icon A1 is linked with the gadget device icon G2 and the widget icon A2 is linked with the gadget device icon G1.

Also, the user can cause the display device 6 to display a screen relating to another APP such as a navigation APP by closing the widget setting screen after linking a widget with a gadget device. As a result, the user can see a screen relating to the APP such as the navigation APP on the display device 6 while seeing the APP information about a widget on the first gadget display 61V and the second gadget display 62V.

Next, in reference to FIG. 5, another method of selecting a widget executed when a wireless communication has been established via the widget setting screen will be described.

Like FIG. 4, FIG. 5 illustrates temporal transitions of states of a gadget device and states of a widget setting screen in three steps: an upper step, a center step, and a lower step. Specifically, FIG. 5 illustrates states of the gadget device at left sides of respective steps and illustrates states of the widget setting screen at right sides of respective steps.

As shown in the right side of the upper step in FIG. 5, the widget setting screen has a region R1A and a region R2 outside of the region R1A. The region R1A includes widget icons A1, A2, and A4 which represent widgets executed when the wireless communication has been established. The region R2 includes a widget icon A3 which represents a widget which can be set to be executed when the wireless communication has been established although it is not set to be as such at the current moment. Also, a region R1 as a part of the region R1A includes gadget device icons G1-G3 which represent gadget devices connected to the on-vehicle device 50. Also, a region R3 as a part of the region R1A includes the widget icon A4 that represents a widget which is executed when the wireless communication has been established but with which there is no gadget device linked. Also, the widget icons A1, A2, A3, and A4 are linked with a first widget, a second widget, a third widget, and a fourth widget, respectively. Also, the gadget device icons G1, G2, and G3 are linked with the first gadget display 61V, the second gadget display 62V, and the gadget camera 2V, respectively.

Also, the right side of the upper step in FIG. 5 shows a state of the widget setting screen where the first widget is linked with the first gadget display 61V and the second widget is linked with the second gadget display 62V. Also, the left side of the upper step in FIG. 5 shows that the APP information about the first widget is displayed on the first gadget display 61V and the APP information about the second widget is displayed on the second gadget display 62V.

Also, the right side of the center step in FIG. 5 shows a state where the widget icon A2 in the region R1 linked with the second widget is dragged to the region R2 and dropped in the region R2 and the lower step in FIG. 5 shows a state after that. Also, the left side of the center step in FIG. 5 shows that there is no change in states of the first gadget display 61V and the second gadget display 62V in the course of the above drag and drop operations.

In the right side of the lower step in FIG. 5, the widget setting screen shows a state where the fourth widget in place of the second widget is linked with the second gadget display 62V. Also, the left side of the lower step in FIG. 5 shows a state where the APP information about the fourth widget has been newly displayed on the second gadget display 62V which had been displaying the APP information about the second widget.

In this way, even if the number of widgets executed when the wireless communication has been established is greater than the number of gadget devices connected to the on-vehicle device 50, the user can change a widget linked with each of the first gadget display 61V and the second gadget display 62V through the widget setting screen, and can reflect the change in real time.

This means that the on-vehicle system 100 can cause each of the on-vehicle devices 50 mounted on each of a plurality of vehicles and one mobile terminal device 40 to work together. That is, this means that the on-vehicle system 100 can cause each of a plurality of on-vehicle devices 50 having respective gadget device setting information and one mobile terminal device 40 having one widget setting information to work together.

Also, this means that the on-vehicle system 100 can cause one on-vehicle device 50 and each of a plurality of mobile terminal devices 40 to work together. That is, this means that the on-vehicle system 100 can cause one on-vehicle device 50 having one gadget device setting information and each of a plurality of mobile terminal devices 40 having respective widget setting information to work together.

Also, in the above embodiment, the widget setting screen is automatically displayed on the display device 6 when the wireless communication has been established between the mobile terminal device 40 and the on-vehicle device 50. However, the present invention is not limited to this configuration. For example, the widget setting screen may be displayed on the display device 6 if a predetermined operation input to the mobile terminal device 40 has been conducted even before the wireless communication has been established. In this case, the widget setting screen is not able to use the gadget device setting information. Thus, the widget setting screen does not display the region R1 and the gadget device icon. Hence, a widget executed when the wireless communication has been established is displayed on the region R3.

Figure 6:
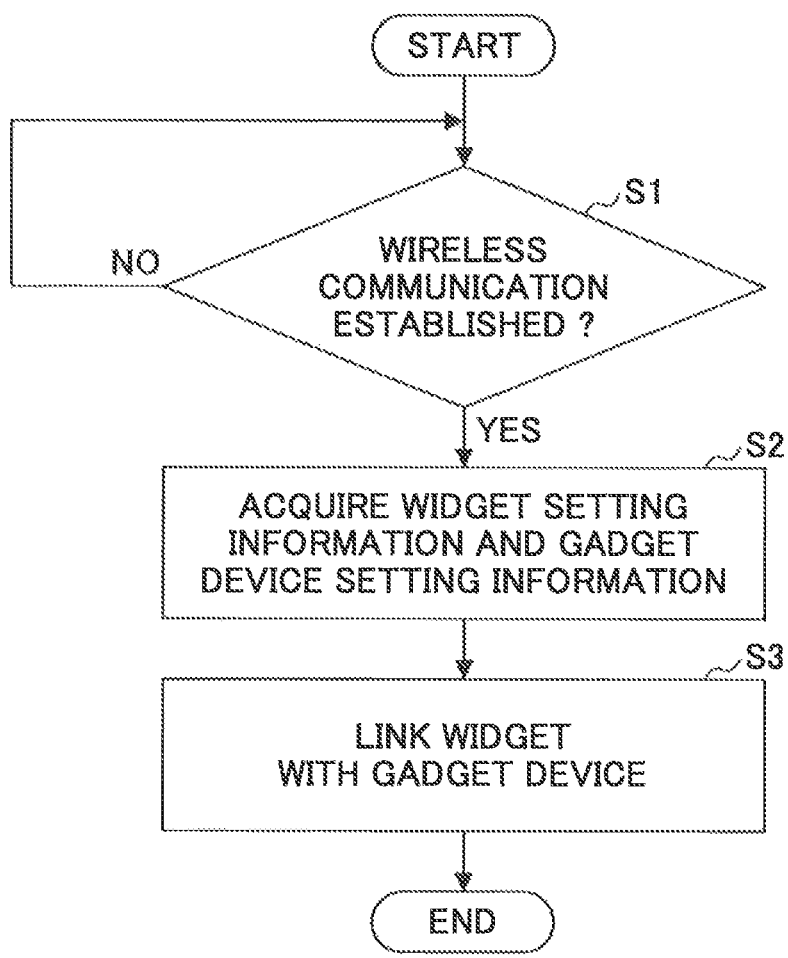
FIG. 6 is a flowchart illustrating a flow of a cooperation processing.

Next, in reference to FIG. 6, a processing in which the on-vehicle system 100 causes the mobile terminal device 40 and the on-vehicle device 50 to work together (hereinafter referred to as "cooperation processing") will be described. FIG. 6 is a flowchart illustrating a flow of the cooperation processing. The on-vehicle system 100 performs this cooperation processing repeatedly at a predetermined frequency.

First, the on-vehicle system 100 determines whether a wireless communication has been established between the mobile terminal device 40 and the on-vehicle device 50 (step S1). The determination whether the wireless communication has been established may be performed at any of the mobile terminal device 40 and the on-vehicle device 50.

If the on-vehicle system 100 determines that the wireless communication has not been established (NO in step S1), the on-vehicle system 100 waits without any change until it determines that the wireless communication has been established.

If the on-vehicle system 100 determines that the wireless communication has been established (YES in step S1), the on-vehicle system 100 acquires the widget setting information and the gadget device setting information (step S2).

In the present embodiment, the on-vehicle system 100 causes the mobile terminal device 40 to read out the widget setting information from the RAM in the control device 1 or the like, and causes the on-vehicle device 50 to read out the gadget device setting information from the RAM in the control device 1V or the like.

Then, the on-vehicle system 100 links a widget executed in the mobile terminal device 40 with a gadget device connected to the on-vehicle device 50 (step S3).

In the present embodiment, the on-vehicle system 100 links a widget with a gadget device based on the widget setting information and the gadget device setting information. Specifically, the on-vehicle system 100 causes the mobile terminal device 40 to transfer the widget setting information to the on-vehicle device 50, and causes the on-vehicle device 50 to link a widget with a gadget device based on the widget setting information and the gadget device setting information.

Also, the on-vehicle system 100 may cause the widget setting screen to be displayed on the display device 6 automatically. This is to urge a user to modify or confirm the widget setting information.

Also, in the present embodiment, the on-vehicle system 100 links a plurality of widgets with a plurality of gadget displays in one-to-one correspondence. However, the present invention is not limited to this configuration. For example, the on-vehicle system 100 may link a plurality of widgets with one gadget display. In this case, a display area of the one gadget display is divided into a plurality of display areas. Also, the widget setting screen enables a linkage between the one gadget device icon and a plurality of widget icons.

Also, the on-vehicle system 100 may link one widget with a plurality of gadget displays. In this case, a piece of APP information about one widget is displayed on the plurality of gadget displays. Also, the widget setting screen enables a linkage between a plurality of gadget device icons and one widget icon.

Also, the on-vehicle system 100 may link a plurality of widgets with a plurality of display areas by using a display area of a main display (not shown) connected to the on-vehicle device 50 as well as a display area of an optional additional display such as the gadget display. In this case, the on-vehicle system 100 may divide the display area of the gadget display into a plurality of display areas, or may divide the display area of the main display into a plurality of display areas.

Next, in reference to FIG. 7, a processing in which a user modifies the widget setting information through the widget setting screen (hereinafter referred to as "setting information modification processing") will be described. FIG. 7 is a flowchart illustrating a flow of the setting information modification processing. The on-vehicle system 100 performs this setting information modification processing each time a condition for automatically displaying the widget setting screen on the display device 6 is met, or each time an operation input for displaying the widget setting screen on the display device 6 is conducted.

First, the on-vehicle system 100 acquires the widget setting information and the gadget device setting information (step S11).

In the present embodiment, the on-vehicle system 100 causes the mobile terminal device 40 to read out the widget setting information from the RAM in the control device 1 or the like, and causes the on-vehicle device 50 to read out the gadget device setting information from the RAM in the control device 1V or the like.

Then, the on-vehicle system 100 displays the widget setting screen (step S12). In the present embodiment, the mobile terminal device 40 in the on-vehicle system 100 generates the widget setting screen based on the widget setting information and the gadget device setting information as shown in the right side of the upper step in FIG. 4. Specifically, the mobile terminal device 40 displays on the region R1 a gadget device icon which represents a gadget device connected to the on-vehicle device 50 and a widget icon which represents a widget executed in the mobile terminal device 40 when the wireless communication has been established. Also, the mobile terminal device 40 displays on the region R2 a widget icon which represents a widget which can be set to be executed when the wireless communication has been established although it is not set to be as such at the current moment.

Then, the on-vehicle system 100 determines whether the widget setting information has been modified or not (step S13). In the present embodiment, the mobile terminal device 40 in the on-vehicle system 100 determines whether the operation input as shown at the right side of the center step in FIG. 4 has been conducted or not.

If the on-vehicle system 100 determines that the widget setting information has been modified (YES in step 13), the on-vehicle system 100 links a widget with a gadget device based on the modified widget setting information and the gadget device setting information (step S14).

Then, the on-vehicle system 100 determines whether the widget setting screen has been closed or not (step S15). Specifically, the mobile terminal device 40 in the on-vehicle system 100 determines whether a condition for automatically closing the widget setting screen has been met or not, or whether an operation input for closing the widget setting screen has been conducted or not.

If the on-vehicle system 100 determines that the widget setting screen has not been closed (NO in step S15), the on-vehicle system 100 executes again procedures in step S13 or later.

If the on-vehicle system 100 determines that the widget setting information has not been modified in step S13 (NO in step S13), the on-vehicle system 100 determines whether the widget setting screen has been closed or not without newly linking a widget with a gadget device (step S15).

If the on-vehicle system 100 determines that the widget setting screen has been closed in step S15 (YES in step S15), the on-vehicle system 100 completes the setting information modification processing this time.

By the above configuration, the on-vehicle system 100 can cause the mobile terminal device 40 and the on-vehicle device 50 to work together so that the APP information about a plurality of widgets is visible on a plurality of display areas when the plurality of widgets are simultaneously executed in the mobile terminal device 40.

Also, the user can allocate a desired widget to a desired gadget display by using the touch panel 3 on the mobile terminal device 40 provided with the display device 6 for displaying the widget setting screen.

The preferable embodiments of the present invention have been described in detail as above. It should be understood that various alternations and substitutions could be made to the above embodiments without being limited by the above embodiments and without departing from the scope of the invention.

For example, in the above embodiments, the gadget controlling part 11V operates on the control device 1V in the on-vehicle device 50. However, the gadget controlling part 11V may operate on the control device 1 in the mobile terminal device 40.

Also, in the above embodiments, the mobile terminal device 40 establishes the wireless communication between the mobile terminal device 40 and the on-vehicle device 50 when the mobile terminal device 40 has been docked in the dock 30. However, the present invention is not limited to this configuration. For example, the mobile terminal device 40 may establish the wireless communication between the mobile terminal device 40 and the on-vehicle device 50 when the mobile terminal device 40 has come within a predetermined area around a driver's seat.

DESCRIPTION OF REFERENCE SYMBOLS 1 control device
2 information acquisition device
2V gadget camera
3 touch panel
4, 4V communication device
5 storage device
6 display device
7 voice input device
8 voice output device
10 widget setting part
11V gadget controlling part
30 dock
30L left guide portion
30R right guide portion
40 mobile terminal device
50 on-vehicle device
61V first gadget display
62V second gadget display
70 steering wheel
100 on-vehicle system

The invention claimed is:

1. An on-vehicle system which causes an on-vehicle device and a mobile terminal device to work together, wherein
the on-vehicle system allocates and displays a plurality of pieces of application software information from the mobile terminal device to a plurality of display areas at one or more display devices connected to the on-vehicle device, the one or more display devices connected to the on-vehicle device being other than a display device on the mobile terminal device,
the mobile terminal device is able to accept an operation input,
the plurality of pieces of application software information are transmitted from a plurality of application software,
the plurality of application software running on the mobile terminal device are allocated via an operation input device on the mobile terminal device to the plurality of display areas,
the display device of the mobile terminal device displays a piece of information from a piece of application software other than the plurality of application software that transmit the plurality of pieces of application software information displayed on the plurality of display areas, and
the plurality of pieces of application software information displayed on the plurality of display areas are not displayed on the display device on the mobile terminal device.

2. The on-vehicle system as claimed in claim 1, wherein,
the operation input device is a touch panel located on the display device on the mobile terminal device,
each of the plurality of pieces of application software information is a piece of information from a widget running on the mobile terminal device,
the display device on the mobile terminal device displays a piece of application software information other than the piece of information from the widget.

3. A mobile terminal device constituting an on-vehicle system which causes an on-vehicle device and the mobile terminal device to work together, wherein
the mobile terminal device outputs a plurality of application software information allocated to and displayed on a plurality of display areas at one or more display devices connected to the on-vehicle device, the one or more display devices connected to the on-vehicle device being other than a display device on the mobile terminal device,
the mobile terminal device is able to accept an operation input,
the plurality of pieces of application software information are transmitted from a plurality of application software,
the plurality of application software running on the mobile terminal device are allocated via an operation input device on the mobile terminal device to the plurality of display areas,
the display device of the mobile terminal device displays a piece of information from a piece of application software other than the plurality of application software that transmit the plurality of pieces of application software information displayed on the plurality of display areas, and
the plurality of pieces of application software information displayed on the plurality of display areas are not displayed on the display device on the mobile terminal device.

4. An on-vehicle device constituting an on-vehicle system which causes the on-vehicle device and a mobile terminal device to work together, wherein
the on-vehicle device is connected to one or more display devices which provide a plurality of display areas on which a plurality of pieces of application software information from the mobile terminal device are allocated and displayed, the one or more display devices connected to the on-vehicle device being other than a display device on the mobile terminal device,
the mobile terminal device is able to accept an operation input,
the plurality of pieces of application software information are submitted from a plurality of application software,
the plurality of application software running on the mobile terminal device are allocated via an operation input device on the mobile terminal device to the plurality of display areas,
the display device of the mobile terminal device displays a piece of information from a piece of application software other than the plurality of application software that transmit the plurality of pieces of application software information displayed on the plurality of display areas, and
the plurality of pieces of application software information displayed on the plurality of display areas are not displayed on the display device on the mobile terminal device.

* * * * *